United States Patent
Tang

(10) Patent No.: US 7,660,200 B2
(45) Date of Patent: Feb. 9, 2010

(54) METHOD FOR COHERENCE-FILTERING OF ACOUSTIC ARRAY SIGNAL

(75) Inventor: Xiao Ming Tang, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 43 days.

(21) Appl. No.: 11/376,070

(22) Filed: Mar. 15, 2006

(65) Prior Publication Data
US 2006/0287830 A1 Dec. 21, 2006

Related U.S. Application Data

(60) Provisional application No. 60/690,880, filed on Jun. 15, 2005.

(51) Int. Cl.
*G01V 1/36* (2006.01)
(52) U.S. Cl. .............. 367/43; 367/45; 367/49
(58) Field of Classification Search ........... 367/25, 367/43–45, 35, 49
See application file for complete search history.

(56) References Cited

U.S. PATENT DOCUMENTS

| | | | | |
|---|---|---|---|---|
| 4,706,225 | A * | 11/1987 | Raoult | 367/43 |
| 5,089,989 | A * | 2/1992 | Schmidt et al. | 367/35 |
| 5,237,538 | A * | 8/1993 | Linville et al. | 367/43 |
| 5,392,213 | A * | 2/1995 | Houston et al. | 702/17 |
| 6,062,081 | A | 5/2000 | Schendel | |
| 6,427,124 | B1 * | 7/2002 | Dubinsky et al. | 702/9 |

OTHER PUBLICATIONS

White, Roy E. "Signal and Noise Estimation from Seismic Reflection Data Using Spectral Coherence Methods." Proceedings of the IEEE, vol. 72. No. 10, Oct. 1984.*
Tubman, K.M., Cheng, C.H., & Toksoz, M.N., 1984, Synthetic Full-waveform Acoustic Logs in Cased Boreholes, II—Poorly Bonded Casing, Geophysics, 51, 902-913.
Block, Cheng, and Duckworth, Velocity Analysis of Multireceiver Full Waveform Acoustic Logging Data in Open and Cased Holes, 56th Ann. Internat. Mtg., Soc. of Expl. Geophys., 1986, Session BHG2.5.
Valero, Skelton, Almeida, Stammeijer & Omerod, Processing of Monopole Sonic Waveforms Through Cased Hole, 73rd Ann. Internat. Mtg., Soc. of Expl. Geophys., 2003, 285-288.

* cited by examiner

*Primary Examiner*—Scott A Hughes
(74) *Attorney, Agent, or Firm*—Bracewell & Giuliani LLP

(57) ABSTRACT

A method waveform processing technique utilizing signal coherence of the array data for processing signals having poor signal-to-noise ratio. Raw waveform data is first transformed into f-k (frequency-wavenumber) domain. A coherence function is then calculated and convolved with the data in the f-k domain, which effectively suppresses non-coherent signals in the data. For the remaining coherent data, the unwanted part is muted and the wanted part is retained and inverse-transformed to yield the coherence-filtered array waveform data. After this processing, small signals that are hidden in the original data are extracted with much enhanced coherence. Subsequent processing of the data yields reliable information about formation acoustic property.

18 Claims, 9 Drawing Sheets

METHOD FOR COHERENCE-FILTERING OF ACOUSTIC ARRAY SIGNAL

RELATED APPLICATIONS

This application claims priority from U.S. Provisional Application No. 60/690,880, filed Jun. 15, 2005, the full disclosure of which is hereby incorporated by reference herein.

BACKGROUND OF THE INVENTION

1. Field of the Invention

The present invention relates to a method and system of filtering signal data. More specifically, the present invention relates to a method and system for analyzing signal data collected by an array of receivers, determining the coherence function of the received data, and filtering the received raw data with the coherence function.

2. Description of Related Art

Data collection arrays, i.e. a collection of more than one single position point data recorders, are used in the collection of a myriad of data. Examples of array collected data include radar, seismic, acoustic, sonar, radio waves, to name but a few. Often the data received and recorded by such arrays can include unwanted signals that intermingle with the desired data and distort the final recordings thereby providing skewed results. Moreover, when dealing with arrays of data recording devices, the time lag between signals of the individual recorders is especially important. While the recorded data can be processed and filtered to remove the noise and to extract information from the time lag, there still exists room for significant improvement in processing such data.

In acoustic logging through an earth formation, acoustic signals that travel along the formation are often contaminated by other acoustic waves that travel along a different path. For example, in the logging-while-drilling measurement, acoustic waves may travel long the tool body (drill collar) and significantly interfere with the formation signals. In cased hole logging, acoustic waves transmission along the casing may become significant if the casing is poorly bonded with cement. Moreover, this wave transmission may become overwhelmingly large if the casing is detached from cement (i.e., the free-pipe situation). Tubman, K. M., Cheng, C. H., and Toksoz, M. N., 1984, Synthetic full-waveform acoustic logs in cased boreholes, II—Poorly Bonded Casing, *Geophysics*, 51, 902,913. In the latter situation, processing acoustic signals to obtain formation properties is extremely difficult because the formation signals are almost in discernible in the presence of overwhelming casing waves. Because the majority of existing wells are cased and there is often a need to determine acoustic properties through casing, acoustic logging in cased borehole is still routinely made because formation properties can be measured when casing is well bonded with formation. Tang, X. M., and Cheng, C. H., 2004, *Quantitative Borehole Acoustic Methods*, Elesevier. However, the measured data are often abandoned when casing is poorly bonded or detached because of the interference caused by the waves passing through the casing.

Because of the need to measure formation acoustic properties through a poorly bonded/detached casing, various methods have been tested to process acoustic data under these conditions. A common practice is to apply the routine semblance method directly to the data and to detect the small events on the semblance correlogram that are associated with the formation arrivals. This method often fails because the formation signals, although they theoretically exist, are small compared to the large casing ringing signals and are thus difficult to distinguish from noises in the data. A maximum likelihood method was also used to enhance the resolution of the formation signal on the correlogram. Block, L. V., Cheng, C. H. and Duckworth, G. L., 1986, Velocity Analysis of Multi-receiver Full Waveform Acoustic Logging Data in Open and Cased Holes, 56th Ann. Internat. Mtg.: Soc. of Expl. Geophys., Session:BHG2.5. However, due to the amplitude difference between the formation and casing signals, the enhanced resolution is not of much help in resolving the low-coherence formation signal with a poor signal-to-noise ratio.

A need exists to suppress the strong casing signal so that the formation signal coherence can be enhanced, to accomplish this a waveform subtraction method was developed to suppress the casing signals. Valero, H., Skelton, O., Almeida, M., Stammeijer, J. and Omerod, M., 2003, Processing of Monopole Sonic Waveforms Through Cased Hole, 73rd Ann. Internat. Mtg.: Soc. of Expl. Geophys., 285-288. By insolating a portion of the casing waves ahead of the formation arrival and subtracting the waves from the data, the formation signal coherence is enhanced and the signal can thus be picked from the semblance processing. However, as stated in Varelo et al (2003), the method does not work well when the casing and formation signals overlap in time. Therefore, there exists a need for a device and method capable of processing signal data and successfully filtering away unwanted portions of the acquired signal.

BRIEF SUMMARY OF THE INVENTION

The present method disclosed herein involves a method of waveform processing technique utilizing signal coherence of the array data for processing signals having poor signal-to-noise ratio. Raw waveform data is first transformed into f-k (frequency-wavenumber) domain. A coherence function is then calculated and convolved with the data in the f-k domain, which effectively suppresses non-coherent signals in the data. For the remaining coherent data, the unwanted part is muted and the wanted part is retained and inverse-transformed to yield the coherence-filtered array waveform data. After this processing, small signals that are hidden in the original data are extracted with much enhanced coherence. Subsequent processing of the data yields reliable information about formation acoustic property.

The present invention includes a method of processing signal data comprising, obtaining signal data, obtaining a coherence function relating to the signal data, and filtering the signal data with the coherence function thereby producing coherence filtered data. The signal data comprises, among other data, downhole acoustic data. The filtering of the present method can be performed in the frequency-wavenumber domain. The method of can further comprise suppressing unwanted signals from the coherence filtered wave data as well as optionally further comprising converting the coherence filtered wave data into the time domain. The step of obtaining signal data comprises, creating a seismic signal within a wellbore casing and recording the resulting wave propagating through the casing. The signal data may comprise an array of propagating wave signals.

With regard to the present method, the coherence filtered wave data $X_{cfil}(k,\omega)$ can be developed with the following equation:

$$X_{cfil}(k,\omega) = X(k,\omega) \cdot coh(k,\omega).$$

Wherein coh(k,ω) represents a coherence function of one or more than one wave mode and X(k,ω) represents signal data.

The present invention disclosed herein may also include a data analysis system comprising, a transducer array having an array of transducers, and a data processor in communication with the array. The array is capable of receiving raw data that is communicated to the processor, wherein the processor calculates a coherence function relating to the raw data and filters the raw data with the coherence function to produce coherence filtered data. Optionally included with data analysis system is a downhole sonde on which the array is affixed. The data analysis system may further comprise a field truck in communication with the sonde. Further optionally, the processor may be housed within the field truck and may be in communication with the field truck. The array of the data analysis system can comprise a surface mounted instrument. Optionally, the surface mounted instrument can comprise an accelerometer. Alternatively, the data analysis system can further comprise a drilling system comprising a drill string and a drill bit. The array may be disposed on the drill string or optionally on the drill bit.

DETAILED DESCRIPTION OF THE INVENTION

Disclosed herein is a method of processing signals that may have poor signal-to-noise ratio. This is required so that useful information can be extracted from the signals that would otherwise be deemed unusable by conventional means. While this may be present itself in multiple situations, poor signal-to-noise ratio scenarios are frequently encountered in acoustic logging practice. For example, cased-hole acoustic data logged in free-pipe are often abandoned because the formation signals are usually untraceable due to the presence of predominant casing signals. The disclosed method is not limited to acoustic logging applications; it can generally be applied to any array data that comprise propagation wave signals. The wave signal array data, for example, may comprise seismic waves recorded at different depth levels in a Vertical Seismic Profiling (VSP) survey, or the seismic waves recorded by a geophone array in a surface seismic survey. In earthquake seismology, the signals may be the earthquake-generated seismic waves recoded at different stations/observatories. Apart from the elastic/seismic waves, the wave signals may also be the electromagnetic waves recorded by a sensor array, for example, radar waves recorded by an array of antennas.

The coherence-filtering technique disclosed herein significantly improves the situation of a poor signal-to-noise ratio. Application of this technique to various difficult conditions, especially cased-hole acoustic logging, has been remarkably successful. In the cased-hole scenario, coherence-filtering outperforms other currently known techniques. The processing technique described herein allows for the acquisition of formation properties through poorly bonded well casing that are unobtainable by conventional techniques. The technique disclosed herein has produced several important applications in acoustic logging data processing. For example, it has been applied to process cased-hole acoustic data in the free-pipe situation with remarkable success and also been proven effective in suppressing tool-wave effects in the logging-while-drilling (LWD) acoustic data processing.

The present disclosure describes a coherence-filtering technique to significantly enhance the coherence of signal events. When the signals are recorded by the receiver array of an acoustic tool, this technique is especially advantageous when the signals are masked by other overwhelming waves or noises and thus have a poor signal-to-noise ratio. The filtering process is performed in the frequency-wavenumber (commonly known as f-k) domain. The technique employs a coherence filter constructed from the coherence function of the array wave data. After filtering the data with the filter, non-coherent noises are suppressed and the coherence of the wanted signal(s) is enhanced and can further be separated by either muting the unwanted (coherent) signals or passing the wanted signal(s) in the f-k domain.

Figure 1:
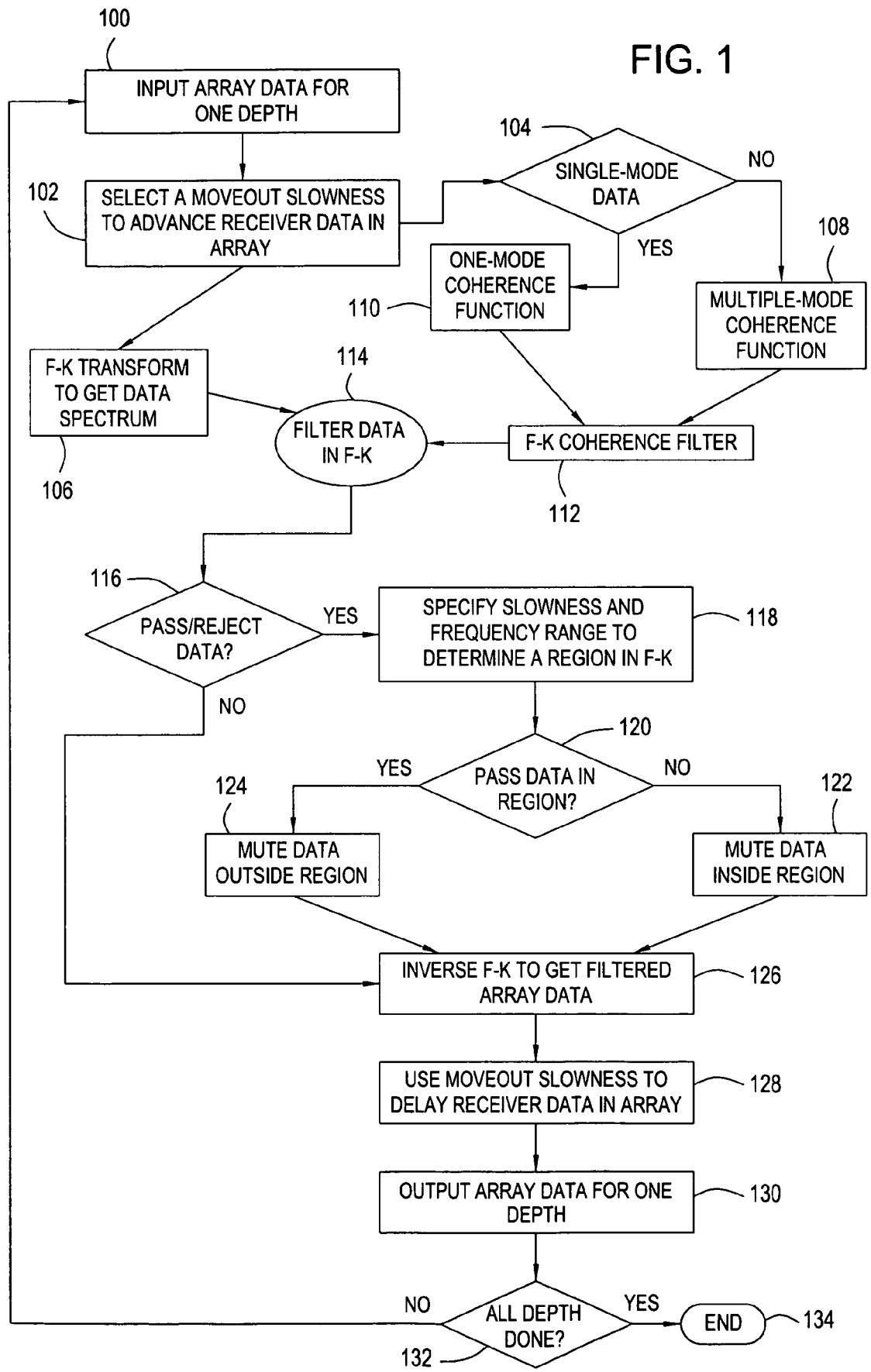
FIG. 1 illustrates a flowchart of an embodiment of a method of filtering raw data.

The flowchart of FIG. 1 illustrates an embodiment of the present invention directed to signal processing of acoustic signals received downhole. In modern acoustic logging in a borehole, the acoustic wave time series X(t), where t represents time, is recorded by an array of receivers equally spaced along the borehole z-axis (step 100). The wave data in essence are a two-dimensional function of z and t, denoted as X(z,t). The two-dimensional Fourier transform, known as the f-k transform, of the data is:

$$X(k,\omega) = \iint X(z,t) e^{-i(kz-\omega t)} dz dt, \quad (1)$$

where $\omega = 2\pi f$ is the angular frequency and k is the axial wavenumber.

A very useful property of the f-k transform is that a linear moveout of slowness s for a wave signal in the z-t domain corresponds to a linear trend of the wave energy that can be traced to the center of the f-k plane, where k and f are respectively the horizontal and vertical coordinate of the rectangular coordinate system in the f-k plane. This property allows for delineating the moveout and dispersion (i.e., change of wave slowness or velocity with frequency) characteristics of the waveform data in a receiver array.

It should be pointed out that the f-k technique, although extensively used in seismic data processing has some serious limitations in the acoustic log data processing practice. Yilmaz, O., 1987, *Seismic Data Processing*, Soc. of Expl. Geophys. 526. For conventional wireline and LWD array acoustic data, this technique is rarely used because the data are over sampled in time but sparsely sampled in space. The number of receivers in array, N, is typically eight or fewer. (For LWD acoustic tools, N is usually four or six). The sparse spatial sampling and short array length causes problems for the array acoustic data in the f-k domain. Firstly, in the f-k plane, the energy density of various wave modes may be closely clustered and smeared by noise, making it difficult to distinguish data trends of the wave modes. (An example of this is given in FIG. 2b.) This happens because the receiver array length (typically 3.5 ft or 1.07 m) is usually not long enough to allow waves of different moveouts to separate in time and space.

Another problem with the f-k technique is that strong spatial aliasing effects may exist in the f-k data of an acoustic array. The Nyquist wavenumber beyond which the aliasing effect occurs is given by:

$$k_{Nyquist} = \frac{2\pi}{2 \cdot d} \tag{2}$$

where d is receiver spacing. For a typical receiver spacing of d=0.5 ft (0.1524 m), $k_{Nyquist}$ is only 6.28/ft. For this low value of $k_{Nyquist}$, aliasing usually occurs at higher frequencies. For example, a 10-kHz compressional wave with an 8000 ft/s velocity has a wavenumber of k=7.85/ft (>6.28/ft), resulting in the aliasing of the wave data, that is, the data beyond k=6.28/ft will wrap around from k=−6.28/ft in the f-k plane. The aliased data may overlay with the clustered/noise-smeared f-k data, aggravating the problem.

The spatial aliasing effects of a wave mode can be alleviated or avoided by applying time shifts in the array data of the wave mode (step 102). For a wave signal with a moveout slowness s, we use this slowness to shift or advance the wave time series of the nth receiver in array by an amount:

$$\Delta t = s(n-1)d, (n=1,2,\ldots,N), \tag{3}$$

The shifted wave signal will then have almost no moveout in the array and, by applying the f-k transform to the data (step 106), its trend (or energy density contour) in the f-k plane will have an infinite slope. In other words, the data trend will lie on, or very close to, the frequency axis, and will therefore not be aliased in the f-k plane.

With regard to coherence filtering, this technique has been developed to better delineate data trends in the f-k domain than the straightforward f-k transform. The mathematical basis of the coherence-filtering technique is to approximate the spectral array data, as obtained by Fourier-transforming the acoustic wave traces, by a number of propagation wave modes, $$X_n(\omega) = \sum_{p=1}^{M} A_p(\omega) e^{ik_p(n-1)d}, \tag{4}$$

$$(n=1,\cdots,N),$$

where M (≧1) is the total of wave modes in array; $A_p$, $k_p = \omega s_p$, and $s_p$ are respectively the spectral amplitude, wavenumber, and slowness of the pth wave mode. This approximation is a quite accurate description for acoustic logging data that primarily consist of guided wave modes in the borehole, such as pseudo-Rayleigh and Stoneley waves in monopole logging, flexural wave in dipole logging, and screw wave in quadrupole logging, and the like. Even for refracted (compressional and shear, or P and S) head waves along the borehole, the propagation-mode approximation is still valid because the receiver array is typically several wavelengths away from the source such that the wave amplitude $A_p$ of the waves does not vary significantly across the array.

In step 104, the question is posed if the data is comprised of a single wave mode or multiple wave mode. If the array data is comprised primarily of a single wave mode (e.g., in dipole acoustic logging, the dipole-flexural wave is the only mode that dominates the data.), then a single-mode coherence function can be constructed in the f-k domain (step 110), as given by (Tang and Cheng, 2004):

$$coh(k,\omega) = \frac{\left\| \sum_{n=1}^{N} X_n^*(\omega) e^{ik(n-1)d} \right\|}{\sqrt{N \sum_{n=1}^{N} X_n^*(\omega) X_n(\omega)}} \tag{5}$$

where * denotes taking the complex conjugate of the data and ‖·‖ denotes taking the modulus of the complex quantity inside. For the data described by equation (4), we see that if the wavenumber variable k attains the value of $k_p$, the wavenumber the propagation mode, then the phase of $X_n^*(\omega) e^{ik(n-1)d} \approx A_p e^{[i(k-k_p)(n-1)d]}$ in equation (5) will be canceled and the coherence function value will be maximized (the value will approach 1 if the data are noise-free). Equation (5) is essentially a semblance/coherence stacking of the array data in the f-k domain. A property of the coherence function defined in equation (5) is that it is mainly applicable for single-mode data. If the data consist of more than one mode, then the coherence will be biased toward the dominant wave mode that has the highest amplitude or coherence, resulting in underestimating the contribution from other wave modes. Nevertheless, this property, if properly used, can significantly enhance the coherence of a designated wave mode.

If the wave data consist of multiple wave modes, such as the compressional, shear, and Stoneley waves in a typical monopole logging data set acquired in a fast formation, then a multiple-mode coherence function should be used (step 108). Here the construction of this function is briefly described. The M propagation exponentials $e^{ik_p d}$, (p=1, . . . , M) in equation (4) satisfy the following characteristic polynomial equation (Tang and Cheng, 2004):

$$a_0 e^{ik_p M d} + a_1 e^{ik_p(M-1)d} + \ldots + a_M = 0, (p=1,\ldots,M) \tag{6}$$

where $a_0 = 1$; other coefficients $a_p$ (p=1, . . . ,M) (note these coefficients are dimensionless) need to be solved from the array data. By combining equations (4) and (6), it is easily shown (see Tang and Cheng, 2004) that data at receiver n, as described by equation (4), can be predicted by a linear combination of the data from other receivers, as given by:

$$X_n(\omega) = -\sum_{p=1}^{M} a_p X_{n-p}(\omega), \tag{7}$$

$$(M+1 \leq n \leq N)$$

Equation (7) is called forward prediction because the receiver whose data is being predicted is ahead of the receiver(s) whose data are used to predict. To in crease data redundancy, the complex conjugate of equation (4) is taken and then combined with equation (6) to yield another prediction:

$$X_n^*(\omega) = -\sum_{p=1}^{M} a_p X_{n+p}^*(\omega), \quad (8)$$

$$(1 \le n \le N - M)$$

Equation (8) is called backward prediction because the receiver whose data is being predicted is behind the receiver(s) whose data are used to predict. Equations (7) and (8) are then combined and simultaneously solved using the Kumaresan/Tufts (known as the KT) method to yield the coefficients $a_p$ (p=1,...,M). Tufts, D. W., and Kumaresan, R., 1982, Estimation of Frequencies of Multiple Sinusoids: Making Linear Prediction Perform Like Maximum Likelihood, Proc. IEEE, 70, 75-89. With the coefficients known in equation (6), we replace the wave mode wavenumber $k_p$ with the wavenumber variable k in this equation and use it to construct a multiple-mode coherence function:

$$coh(k, \omega) = \exp\{-\|a_0 e^{ikMd} + a_1 e^{ik(M-1)d} +, \cdots, +a_M\|^2\}. \quad (9)$$

Since the polynomial function in equation (9) has the same functional form as that in equation (6), the function approaches zero when the k variable hits one of the roots $k_p$, (p=1, ... ,M) of equation (6); the coherence function in equation (9) will then approach a maximum value of 1. For other values of k, the (dimensionless) modulus of the function inside ∥·∥ is large and the coherence function value is low; the function approaches zero if k is far away from $k_p$. Therefore, the high-value region of the coherence function effectively delineates the trajectories/trends of the coherent part of the data in the f-k plane, especially when the data contain several propagation modes.

It is worthwhile to comment on the data coherence function, as computed from equation (5) (single mode) or equation (9) (multiple mode), versus the data energy density, as obtained from the direct f-k transform (equation (1)). The f-k data density reflects the wave energy distribution in the f-k plane. However, a region with high energy density may not necessarily mean that the data there is coherent. In comparison, the coherence function is a measure of data coherence in the f-k plane. Even in regions where the data energy density is low, the coherence function value can still be quite significant as long as the data are coherent in these regions. (An example of comparing the wave energy density and coherence is given in FIG. 2b and FIG. 2c.) Therefore, the data coherence function, compared to the data energy density, can better delineate data trends in the f-k domain.

Using the given coherence function (single mode: equation (5); multiple-mode: equation (9)) as a coherence filter (step 112), a coherence-filtering processing can be performed (step 114). According to a property of (two-dimensional) Fourier transform, filtering or convolving the data X(z,t) in the z-t domain with a filter (the coherence filter) is equivalent to multiplying the f-k transformed data X(k, ω) with the filter's f-k spectrum in the f-k domain. Therefore, the coherence-filtered wave data in f-k domain, designated as $X_{cfil}$ (k, ω), is simply $$X_{cfil}(k,\omega)=X(k,\omega)\cdot coh(k,\omega) \quad (10)$$

Because the coherence function coh(k,ω) delineates the trajectory/region of the propagation modes (the coherent data) in the f-k plane, multiplying the f-k data X(k,ω) with the function retains the data in the coherent region and reduces/mutes the data outside the region, thus suppressing the non-coherent (or noise) part of the data.

For the remaining coherent part of the data, further processing can be done to reject/suppress unwanted signals (step 116). For example, in cased-hole acoustic logging, the dominant ringing casing waves are very coherent and should be suppressed in order to pick the formation signal of much smaller amplitude. The condition for separating the wanted from unwanted signals is that they should have distinctively different propagation velocity (or slowness) values. For formations with intermediate and slow velocities, this condition is satisfied. For instance, if the formation slowness is greater than 80 μs/ft, as compared to the typical casing slowness 57 μs/ft, then the casing waves can be effectively suppressed (step 118).

There are at least two ways to suppress the unwanted wave signals. The first is a data rejection method that uses a known fan-filtering technique in the f-k plane (e.g., Yilmaz, 1987) (step 120). The fan-shaped region is bounded by two (left and right) lines originating from the center of the f-k plane. This region should cover the data trend of the unwanted signal (step 124). For filtering the casing wave with a 57 μs/ft slowness, the corresponding slowness of the left line of the fan can be set to 57−20=37 μs/ft and that of the right line, to 57+20=77 μs/ft. If the waveform data have been shifted using equation (3) (the data trend now lies on the frequency axis), then the slowness value can be set to −20 μs/ft for the left line, and 20 μs/ft for the right line. Then, rejecting the data by muting the value of $X_{cfil}$ (k,ω) within the fan suppresses the unwanted casing signal.

The second method to suppress the unwanted wave signals is a data passing method (step 122). This method needs to have a rough estimate of the propagation slowness of the wanted wave signal. To avoid possible aliasing of the wanted signal in f-k domain, the slowness in equation (3) is used to shift the data and then transform the data to f-k domain. The data trend of the wanted signal should now lie in the vicinity of the frequency axis. Because now only one signal is involved, the single-mode coherence function (equation (5)) can be used to filter the data in a fan-shaped region surrounding the frequency axis. Using the same cased hole situation as an example with a casing wave slowness of 57 μs/ft and a formation wave slowness of 100 μs/ft (this slowness is used in equation (3) to shift the data), the slowness corresponding to the left and right lines of the fan can be set to −30 μs/ft and 30 μs/ft, respectively. After the operation using equation (10), the $X_{cfil}$(k,ω) data in the fan primarily contains only one signal and the signal coherence should be much enhanced. Then passing the data in the fan and muting the data outside the fan yields the wanted signal.

The coherence-filtered f-k spectral data $X_{cfil}$(k,ω), either with or without the fan-filtering, are inverse-transformed back in to z-t domain to obtain the coherence-filtered array waveform data, as given by (step 126):

$$X_{cfil}(z, t) = \int \int X_{cfil}(k, \omega)e^{i(kz-\omega t)}dkd\omega \quad (11)$$

If time shifts, as given in equation (3), were applied to advance the receiver waveform data prior to transforming the data to f-k domain, the same time shifts should now be applied to delay the filtered data so as to restore the original time position of the wave data (step 128). The resulting array data for one array location in depth can then be output (step 130) for being processed/analyzed to extract formation acoustic properties for that depth. The same processing is then performed for all depths of interest (steps 132, 134). The above-described processing procedures are summarized by the flow chart in FIG. 1. The results of applying the coherence-filtering technique to acoustic data processing will be demonstrated in the following non-limiting examples of the method of the present disclosure.

EXAMPLE 1

A Real Data Example to Demonstrate the Coherence-Filtering Procedure

Figure 2A:
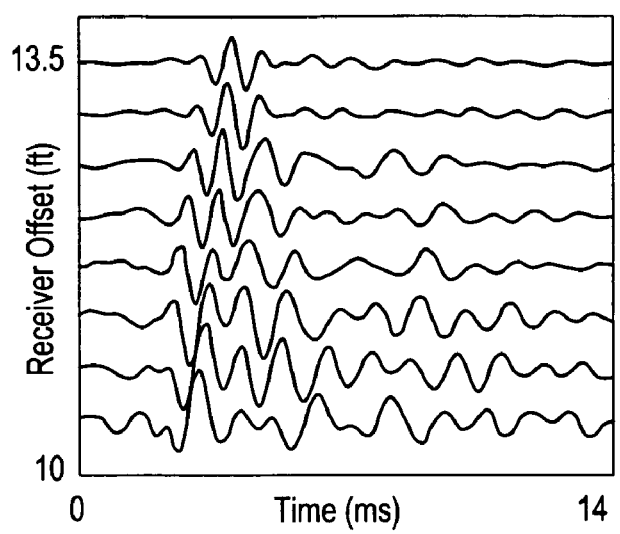
FIG. 2a demonstrates a collection of signal data in the time domain collected by a recorder array.

FIGS. 2a-2e demonstrate the coherence filtering procedure using a field dipole data example. Here the data were recorded by a wireline dipole acoustic logging tool. The tool consists of a dipole transmitter and an array of receivers that are located about 10 ft above the transmitter and aligned longitudinally along the tool. FIG. 2a is a graphical depiction of raw low-frequency dipole array acoustic data recorded by an array of equally spaced acoustic receivers. This data can also be referred to as received data or a received signal. The ordinate represents time and the abscissa represents the distance between the dipole source transmitter and the receivers. Significant noise contamination can be seen from the wave reverberations in the raw data of the near receivers.

Figure 2B:
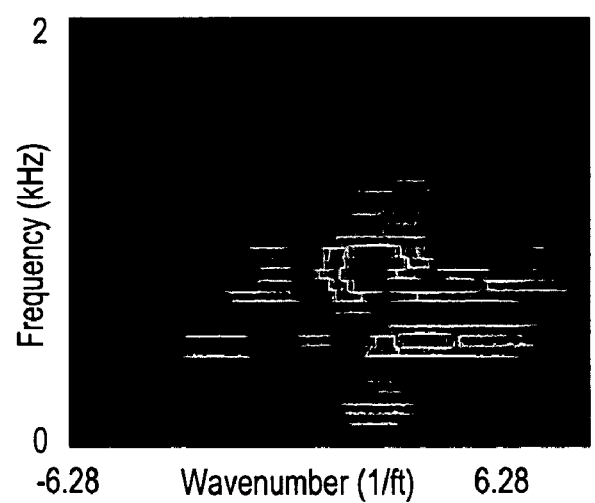
FIG. 2b depicts raw data transformed into the f-k plane.
Figure 2C:
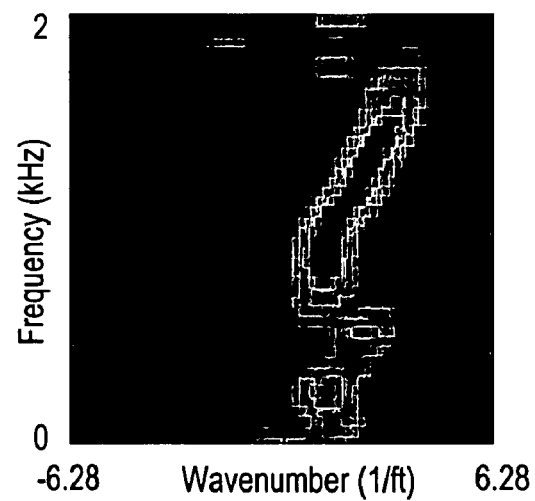
FIG. 2c shows filtered data in the f-k plane.
Figure 2D:
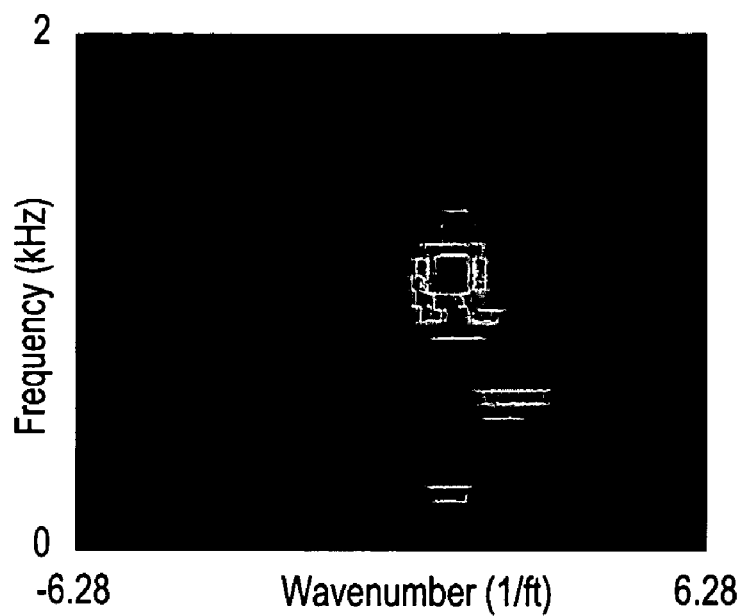
FIG. 2d illustrates the convolved f-k data of FIGS. 2b and 2c.
Figure 2E:
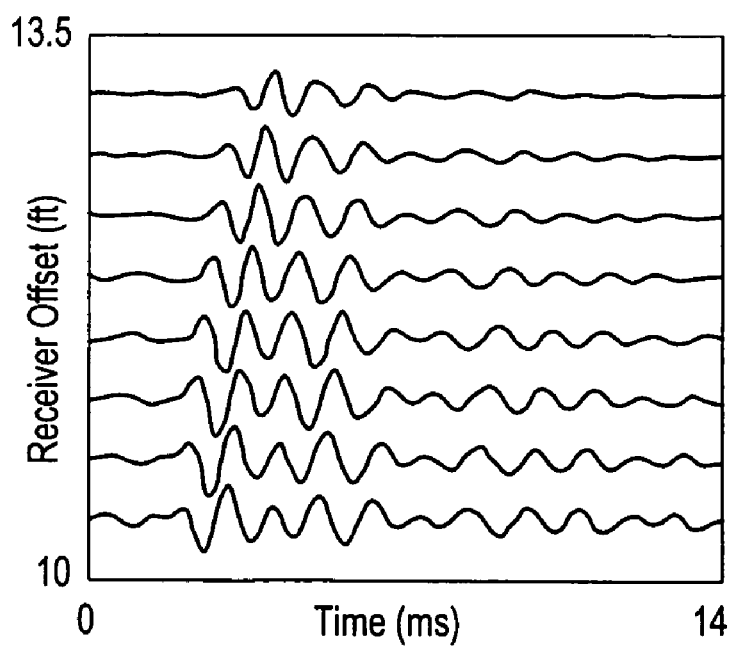
FIG. 2e shows coherence-filtered data in the time domain.

The corresponding f-k spectrum is shown in FIG. 2b where several closely clustered events are exhibited. Since the aliasing effect does not occur for this low-frequency data, no time-shifts were applied to the waveform data before the f-k transform. FIG. 2c shows the resulting plot by applying the coherence function to single-mode scenario of the raw data (equation (5)). As can be seen by comparing the plots of FIGS. 2b and 2c, the f-k coherence plot shows a defined data trend unlike the raw f-k data. FIG. 2d, illustrates the convolved f-k data of FIGS. 2b and 2c. Converting the f-k data of FIG. 2d back into the time domain produces the coherence-filtered data of FIG. 2e. The filtered f-k data, as obtained by multiplying the raw data with the coherence function, shows a dominant trend for the dipole-flexural mode in the f-k plane. Inverse-transforming the data gives the filtered array data with much improved waveform coherence across the array.

EXAMPLE 2

Extracting Formation P Wave from Free Pipe (Synthetic) Acoustic Data

FIG. 3 uses simulated array acoustic data to demonstrate the ability of coherence filtering to extract formation signals through an unbonded casing. This is a free pipe situation with a 0.25-cm thick fluid annulus behind the casing. FIG. 3a illustrates a free-pipe model used to create the array acoustic data and FIG. 3b contains the corresponding modeled data. As with FIG. 2a, the data of FIG. 3b is in the time domain, with the ordinate in time units and the abscissa in distance units. The data shows strong ringing casing waves with almost no discernible formation arrivals. A direct semblance calculation was performed on the data of FIG. 3b and plotted in FIG. 3c. The plot of FIG. 3c on the data (right) shows a dominant casing peak (slowness=57 μs/ft) and a weak formation arrival (slowness=102 μs/ft) with a low semblance/coherent value. FIG. 3d illustrates the coherence-filtered formation signal f-k spectrum for the P-wave slowness range of FIG. 3b. The wave data were shifted using its slowness (102 μs/ft) so that the data almost lie on the frequency axis. Note the bottom event of FIG. 3d represents the Stoneley-wave energy that falls into the data pass region (the fan filter) and the upper two events belong to the formation P wave. The plots of FIG. 3e are obtained by inverse f-k transforming the data of FIG. 3d. These plots depict formation P wave plus a low-frequency Stoneley.

Figure 3A:
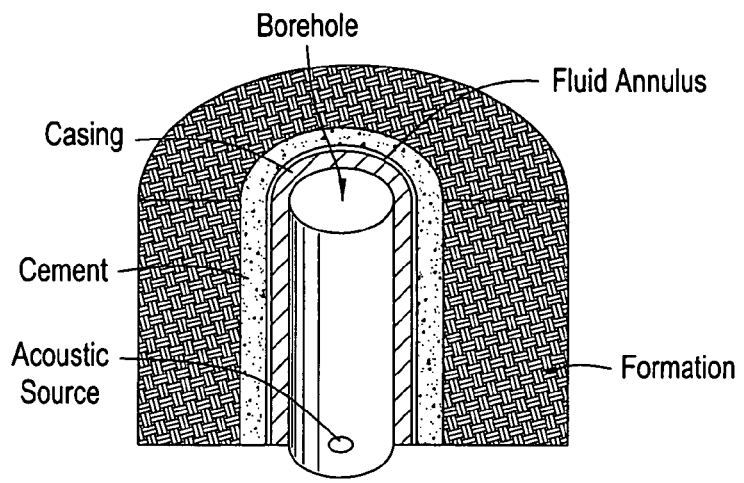
FIG. 3a demonstrates a free pipe model.
Figure 3B:
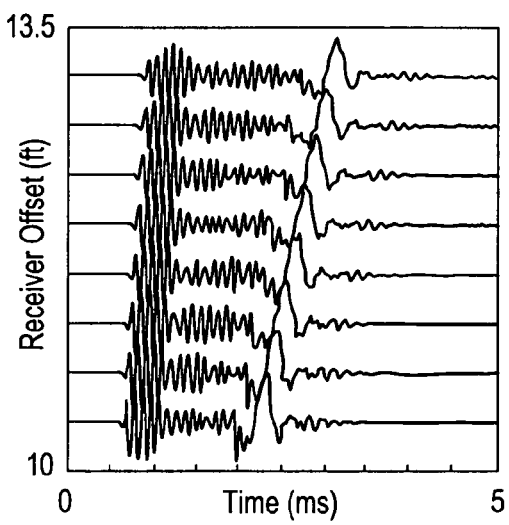
FIG. 3b is a depiction of modeled data.
Figure 3C:
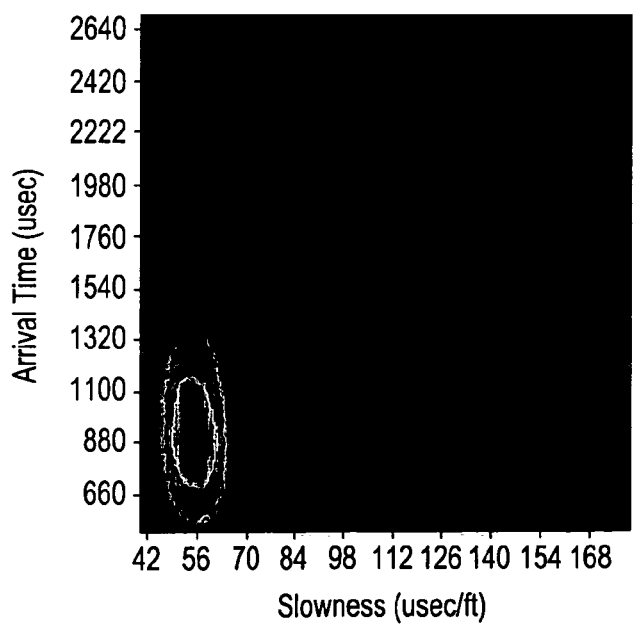
FIG. 3c shows a plot of the results of a direct semblance calculation as performed on the data of FIG. 3b.
Figure 3D:
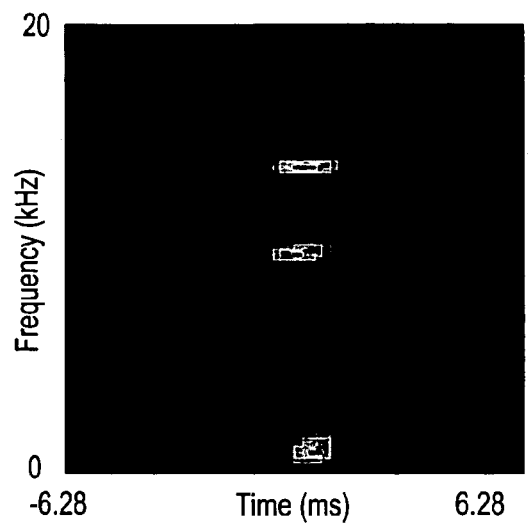
FIG. 3d illustrates the coherence-filtered formation signal f-k spectrum for the P-wave slowness range of FIG. 3b.
Figure 3E:
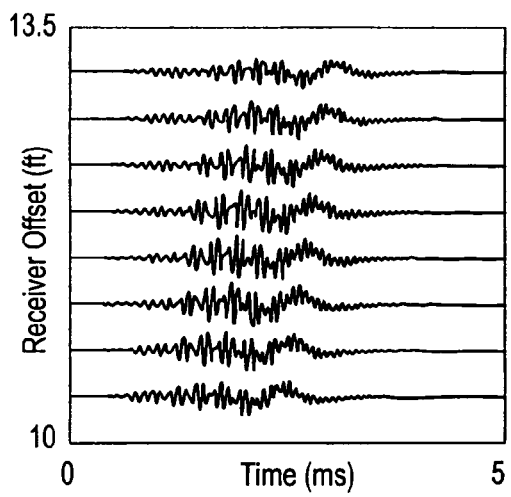
FIG. 3e are plots of an inverse f-k transformation of the data of FIG. 3d.
Figure 3F:
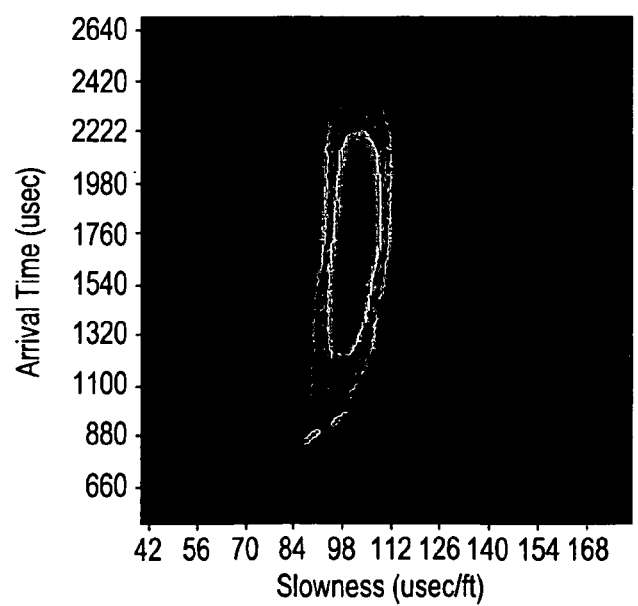
FIG. 3f is a plot of the semblance calculation of the filtered data of FIG. 3e.

As shown in FIG. 3f, subsequent semblance calculation of the filtered data of FIG. 3e shows a well-defined formation arrival at 102 μs/ft. The semblance of the formation wave is much enhanced compared to that of the unfiltered data. Note the disappearance of the casing event from the correlogram. This result points out a useful property of the f-k coherence-filtering technique. Although the unwanted casing wave may not be completely removed from the data of FIG. 3d due to short array and sparse spatial sampling, the coherence of the unwanted wave is largely eliminated. It is eliminated from both from the f-k data spectrum and from the space-time domain semblance correlogram.

EXAMPLE 3

Application to Cased-Hole Acoustic Data to Extract Formation P-Wave Slowness

Figure 4:
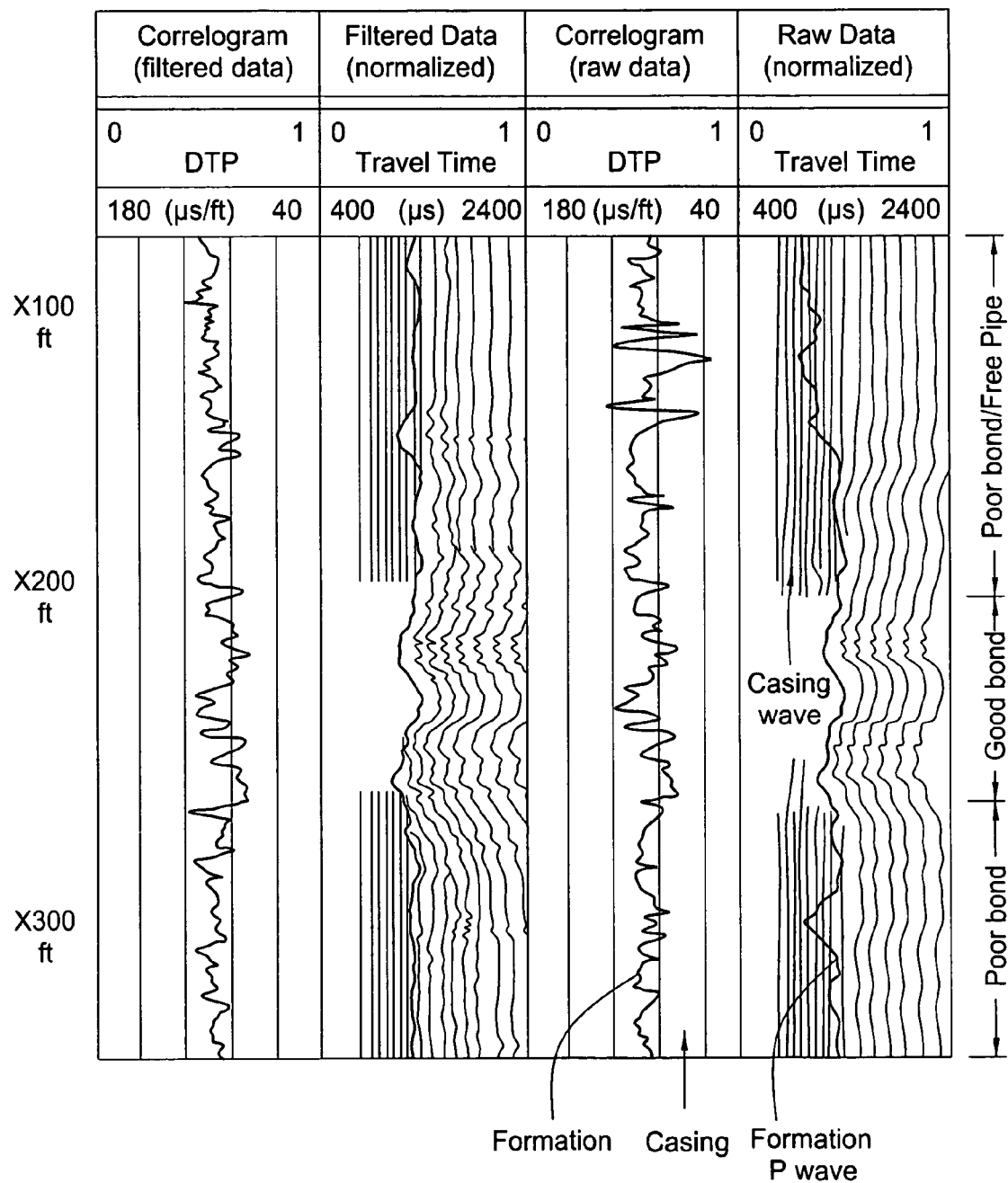
FIG. 4 demonstrates a comparison of raw versus filtered cased hole acoustic data.

FIG. 4 uses a field data example to demonstrate the ability of the coherence-filtering technique to extract formation slowness from cased hole acoustic data, even in the free-pipe situation. The acoustic data, shown in the Raw Data track, include several scenarios: good cement bond (middle), poor cement bond (lower), and poor bond/free pipe (upper). The data in the upper free-pipe sections are dominated by casing signals, resulting in inability to pick formation slowness from the semblance correlogram, which is shown in the Correlogram (raw data) track. As seen in the Filtered Data track, coherence filtering the data suppresses the casing signals and enhances the formation wave coherence. The enhanced coherence enables picking the formation slowness with high confidence even in the free pipe situation (Correlogram (filtered data)).

EXAMPLE 4

LWD (APX) Data Processing to Suppress Tool-Wave Effects

Figure 5:
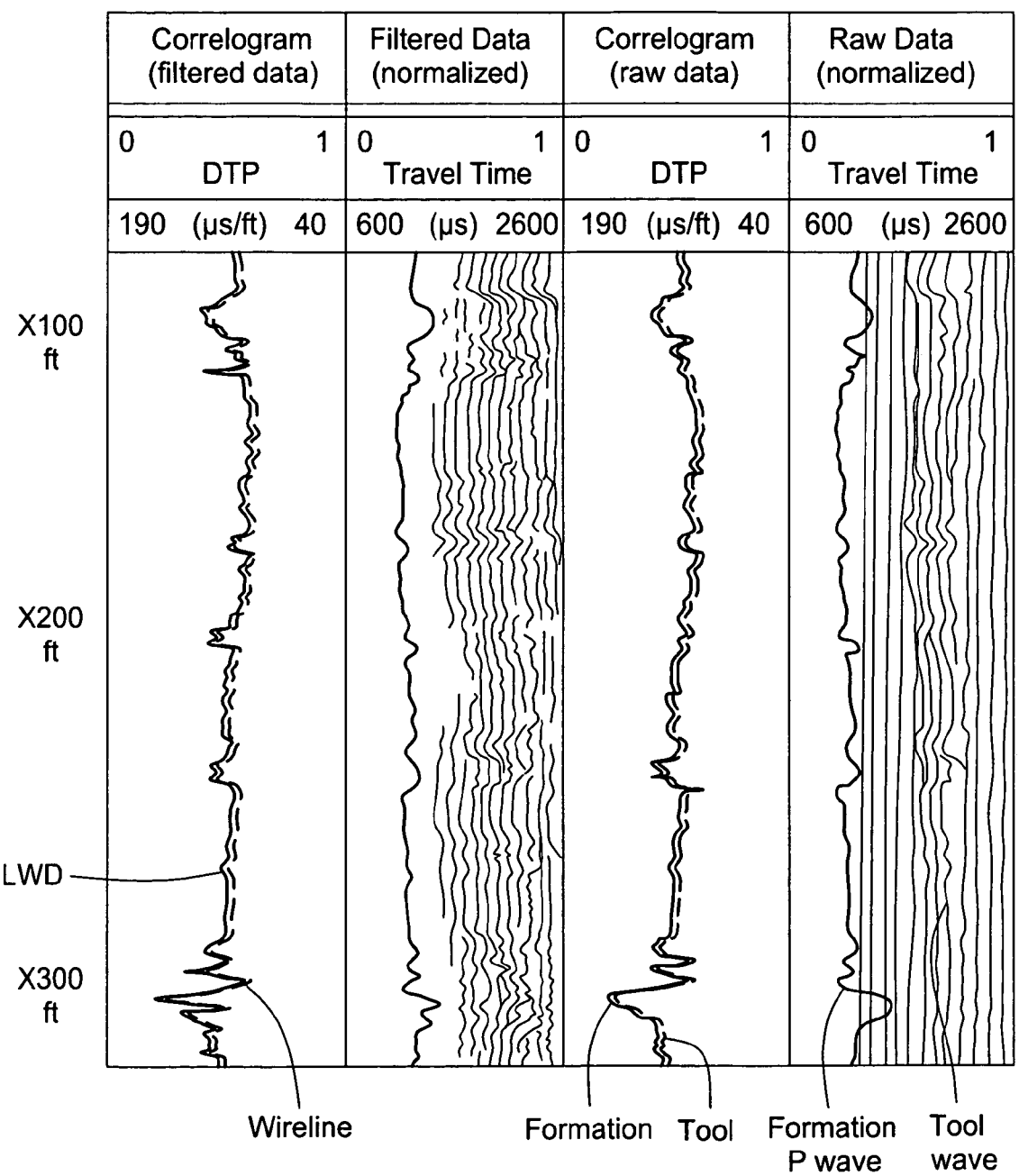
FIG. 5 compares raw data to filtered data in combination with a correlogram.

FIG. 5 demonstrates the advantages of coherence filtering for logging while drilling (LWD) acoustic data for suppressing tool-wave effects. LWD acoustic data is often contaminated by tool waves that travel along an associated drill collar. As seen in the Correlogram (raw data) track of FIG. 5, the tool waves generate a significant semblance value and interfere with the picking of formation slowness. This example may seem trivial because the tool waves are small relative to the formation waves, as compared to the cased hole example in FIG. 4 where formation waves are almost indistinguishable in the free-pipe section. However, one should note that the f-k data from LWD tools are even more hampered compared to those from wireline tools, due to a fewer number of receivers (six, versus eight, the typical number of receivers of a wireline tool) and sparser sampling (0.75 ft, versus 0.5 ft; the Nyquist wavenumber $k_{Nyquist}$ is now even lower, which is only 4.2/ft, versus 6.28/ft of the wireline case). However, the example in FIG. 5 shows that the coherence-filtering technique is still effective despite the increased adversities. The Raw Data track of FIG. 5 displays the LWD data (receiver 1) in VDL, which shows that the data are contaminated by tool waves. The tool waves produce a strong semblance in the Correlogram (raw data) track and interfere with the picking of formation slowness. As shown in the Filtered Data (normalized) track coherence filtering suppresses the tool wave and removes its semblance from the Correlogram (filtered data) track. The enhanced formation signal coherence allows for picking the formation slowness in areas dominated by tool waves as can be seen from the agreement between the picked LWD slowness (curve) and the wireline-measured slowness (markers).

Figure 6:
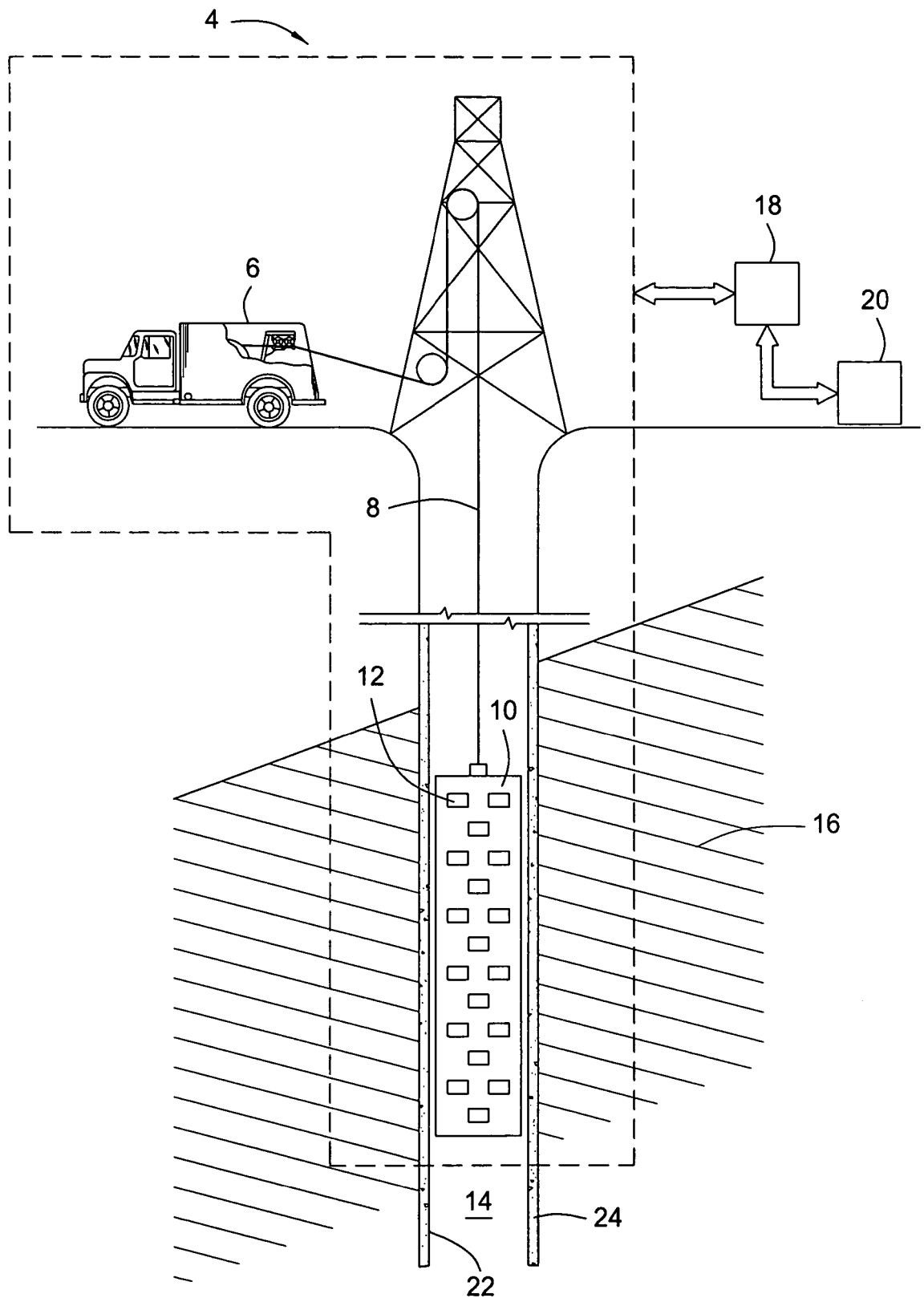
FIG. 6 depicts an embodiment of a data collection system for use with the present method.

A data collection system 4 utilizing an embodiment of the method of the present disclosure is illustrated in FIG. 6. The data collection system 4 as shown comprises a sonde 10 connect by wireline 8 to a field truck 6. Signal data is collected by a sonde 10 disposed within a wellbore 14, where the wellbore 14 pierces a formation 16. An array of transducers 12 is disposed on the sonde 10, the transducers 12 are capable of receiving and recording downhole signals transmitted to the receivers from within the formation 16. The transducers 12 can be capable of transmitting a signal in addition to receiving a signal.

The raw recorded data received by the transducers 12 can be stored within the sonde 10 for later retrieval or processing, or can be transmitted to the field truck 6 via the wireline 8 or telemetry. The method of coherence filtering can be performed within the sonde 10, field truck 6, or the associated processor 18. The processor 18 may be a computer, or microprocessor, with memory capable of running programmed instructions. The processor 18 may also have permanent data storage and hard copy output capabilities. The processor 18 may be a separate unit or may be located in an enclosure attached to the field truck 6 or any other suitable enclosure commonly used in the art. Combining the data collection system 4 with a processor 18 or other means of processing the signal data, such as manually, comprises a data analysis system.

Figure 7:
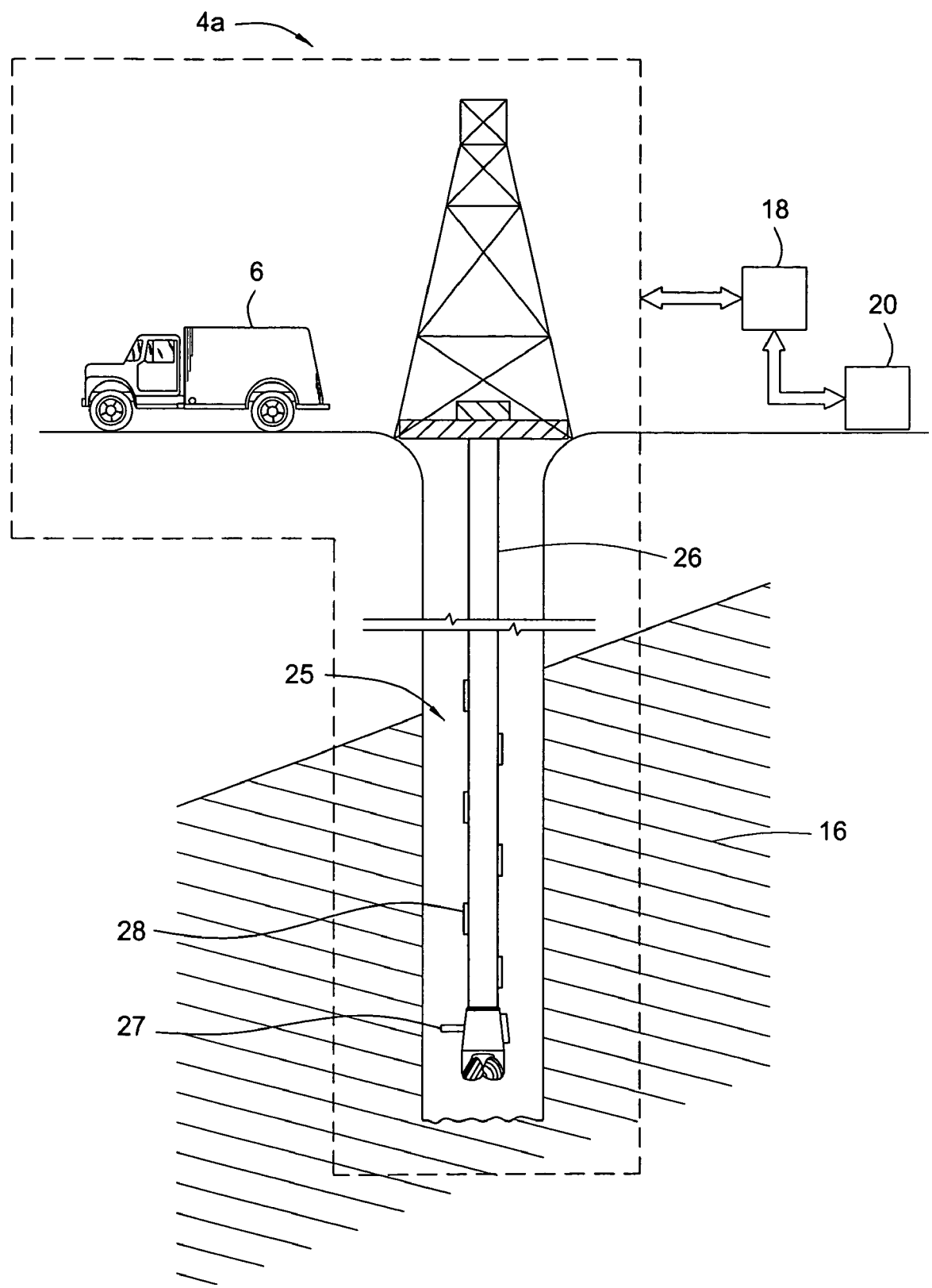
FIG. 7 illustrates an alternative embodiment of a data collection system for use with the present method.

FIG. 7 illustrates an alternative data collection system 4a for use in logging while drilling operations. Here the embodiment of the data collection system 4a is shown coupled with a drilling system 25. The drilling system 25 comprises a drill string 26 having multiple elements and terminating on its lower end at a drill bit 27. Transducers 28 for receiving signal data are shown on the drill string 26 and on the drill bit 27. The transducers 28 can be any type of device capable of receiving signal data while being disposed within the confines of a wellbore 14. Similar to the data collection system 4 of FIG. 6, the signal data collected by the drilling string transducers 28 can be transferred to the processor 18 or to data recording devices (not shown) within the field truck 6. Optionally, processing means can also be included within the drill string 26 for storing the collected signal data and/or processing the data in accordance with the method described herein.

Optionally, a surface mounted transducer 20, such as an accelerometer, can be mounted in mechanical cooperation with the Earth's surface for recording raw seismic signals for storage and subsequent analysis. An example of such an accelerometer can be found in U.S. Pat. No. 6,062,081, issued to Schendel on May 16, 2000. In the embodiment of FIG. 6, the surface transducer 20 communicates with the processor 18 wherein coherence filtering is accomplished. Alternatively, the filtering process can also take place within the immediate confines of the surface transducer 20.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of enhancing signal data comprising:
   obtaining signal data having useful data and non-useful data using a data collection system;
   transmitting the signal data to a processor;
   transforming the signal data into the frequency-wavenumber spectrum with the processor;
   obtaining with the processor a coherence function defined in the frequency-wavenumber (f-k) domain that relates to the transformed signal data; and
   using the processor to multiply the coherence function and the transformed signal data thereby filtering the non-useful data from the signal data.

2. The method of claim 1, wherein the signal data comprises array acoustic data.

3. The method of claim 1 wherein the signal data relates to hydrocarbon exploration.

4. The method of claim 1 further comprising converting said coherence filtered wave data into the time domain.

5. The method of claim 1, wherein said step of obtaining signal data comprises, creating a seismic signal within a wellbore casing and recording the resulting wave propagating through the casing, wherein a bond is disposed between the casing and the wellbore the bond selected from a list consisting of a defective bond, a non-defective bond, and free pipe.

6. The method of claim 1 further comprising lowering a receiver array into a hydrocarbon producing wellbore.

7. The method of claim 6 wherein said receiver array is affixed to a sonde.

8. The method of claim 1 further comprising interrogating a formation.

9. The method of claim 1, wherein said signal data comprise an array of propagating wave signals.

10. The method of claim 1, wherein said signal data comprises an acoustic signal.

11. The method of claim 1 further comprising, generating a generated signal to produce the signal data.

12. The method of claim 1 wherein the coherence filtered wave data $X_{cfil}(k,\omega)$ is developed with the following equation:

$$X_{cfil}(k,\omega)=X(k,\omega)\cdot coh(k,\omega)$$

wherein $coh(k,\omega)$ represents a coherence function of one or more than one wave mode and $X(k,\omega)$ represents signal data.

13. The method of claim 1, wherein said signal data comprises an electromagnetic signal.

14. The method of claim 1, wherein said signal data comprises a radar signal.

15. A method of enhancing acoustic signal data comprising:
- obtaining acoustic signal data that has passed through a hydrocarbon bearing subterranean formation;
- transmitting the acoustic signal data to a processor;
- using the processor to transform the acoustic signal data in the frequency wavenumber spectrum;
- providing a coherence function with the processor that is defined in the frequency-wavenumber (f-k) domain that relates to the transformed acoustic signal data; and
- removing unwanted signal data by filtering the acoustic signal data with the coherence function in the processor.

16. The method of claim 15 further comprising lowering a receiver array into a hydrocarbon producing wellbore.

17. The method of claim 15 wherein the coherence filtered wave data $X_{cfil}(k,\omega)$ is developed with the following equation:

$$X_{cfil}(k,\omega)=X(k,\omega)\cdot coh(k,\omega)$$

wherein $coh(k,\omega)$ represents a coherence function of one or more than one wave mode and $X(k,\omega)$ represents signal data.

18. The method of claim 15 further comprising, generating an acoustic signal in a wellbore surrounded by a formation, passing the signal through a wellbore casing disposed in the formation and a defective bond between the casing and the formation.

* * * * *